(12) United States Patent
Dinha et al.

(10) Patent No.: US 11,818,035 B2
(45) Date of Patent: *Nov. 14, 2023

(54) AUGMENTED ROUTING OF DATA

(71) Applicant: OpenVPN, Inc., Wilmington, DE (US)

(72) Inventors: Francis Dinha, Pleasanton, CA (US); James Yonan, Pleasanton, CA (US)

(73) Assignee: OpenVPN, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/090,337

(22) Filed: Dec. 28, 2022

(65) Prior Publication Data

US 2023/0164062 A1   May 25, 2023

Related U.S. Application Data

(63) Continuation of application No. 17/360,468, filed on Jun. 28, 2021, now Pat. No. 11,588,726.

(60) Provisional application No. 63/049,287, filed on Jul. 8, 2020.

(51) Int. Cl.
*H04L 45/00* (2022.01)
*H04L 45/74* (2022.01)
*H04L 9/40* (2022.01)
*H04L 45/42* (2022.01)
*H04L 45/64* (2022.01)

(52) U.S. Cl.
CPC .............. *H04L 45/20* (2013.01); *H04L 45/42* (2013.01); *H04L 45/64* (2013.01); *H04L 45/74* (2013.01); *H04L 63/0272* (2013.01)

(58) Field of Classification Search
CPC ......... H04L 45/20; H04L 45/42; H04L 45/64; H04L 45/74; H04L 63/0272
See application file for complete search history.

*Primary Examiner* — Blake J Rubin
(74) *Attorney, Agent, or Firm* — A, T, & P; Pete Tormey

(57) ABSTRACT

Disclosed herein are systems and methods for creating an ultra-lightweight multi-tenant network virtualization model by augmenting an OSI layer 4 tuple (protocol, source IP address, destination IP address, source port, destination port) with additional private gateway-specific source and destination augmented addresses. A unique OpenVPN Augmented Address (OAA) may be created and assigned to each device on a network such as a mesh-linked system. This OAA may form part of a packet shim created with routing path information for both the source and the destination resources. Once created, the shim may be inserted into a packet header for transmission. Once the initial packet is transmitted, each hop creates its own resources for managing transmission of subsequent packets in this session. The packet shim operates to establish a communications session on layer 4 (Transport) between the requestor and the target resource which is intermediate-device agnostic.

2 Claims, 2 Drawing Sheets

AUGMENTED ROUTING OF DATA

PRIORITY

This application claims the benefit of co-pending patent application Ser. No. 17/360,468 filed Jun. 28, 2021, by the same inventors, which further claims the benefit of provisional application 63/049,287 filed Jul. 8, 2020 by the same inventors, which is incorporated by reference as if fully set forth herein.

BACKGROUND

The present invention relates generally to transmission and reception of data, and more particularly to efficient routing of data in multi-tenant, mesh linked systems.

Conventionally, an enterprise-wide communications system can implement security measures with layered security such as firewalls, gateway security agents, and the like. However, such layered security systems are prone to processing inefficiencies and can require many resources within the enterprise to maintain the systems. In such a distributed security system, an enterprise can transmit data to and receive data from the distributed security system by use of tunneling technologies. A tunneling protocol enables one network protocol (the delivery protocol) to encapsulate packet that conform to a payload protocol to carry a payload over an incompatible delivery network or can provide a secure path through an open network. Example tunneling technologies include virtual private network (VPN) routers and VPN concentrators can be used to achieve the traffic redirection for tunneling.

The use of tunneling, however, presents the enterprise and the security provider with specific challenges and problems. One problem is that each enterprise has at least one logically independent internet protocol (IP) sub-network. As a result, an end device in a first independent IP sub-network for a first enterprise may have the same IP address as an end device in a second independent IP sub-network for a second enterprise. This hampers the ability to manage multi-tenant networks. For example, when data packets are encapsulated in respective tunnels to the security provider, the tunnel traffic from each enterprise can be readily identified by a tunnel identifier, e.g., the respective IP addresses of the edge routers of each enterprise. However, when the encapsulated packets are decapsulated from the packet, the packets may have the same source IP address and source port. Furthermore, when the packets are being sent to the same external end device, e.g., a search engine server, for example, the destination IP addresses can also be the same, as can the port numbers. Thus, in some cases, the packets from the respective end devices in each enterprise, after decapsulation, can have the same addressing information, resulting in addressing ambiguity.

SUMMARY

Disclosed herein are systems and methods for creating an ultra-lightweight multi-tenant network virtualization model by augmenting an open systems interconnection (OSI) layer 4 tuple (such as protocol, source IP address, destination IP address, source port, destination port) with additional private gateway-specific source and destination augmented addresses. A unique OpenVPN Augmented Address (OAA) may be created and assigned to each device on a network such as a mesh-linked system. This OAA may form part of a packet shim (or padding) created with routing path information for both the source and the destination resources. Once created, the shim may be inserted into a packet header for transmission. Once the initial packet is transmitted, each hop creates its own resources for managing transmission of subsequent packets in this session. The packet shim operates to establish a communications session on layer 4 (Transport) between the requestor and the target resource which is intermediate-device agnostic.

The construction and method of operation of the invention, however, together with additional objectives and advantages thereof will be best understood from the following description of specific embodiments when read in connection with the accompanying drawings.

DESCRIPTION

Generality of Invention

Figure 1:
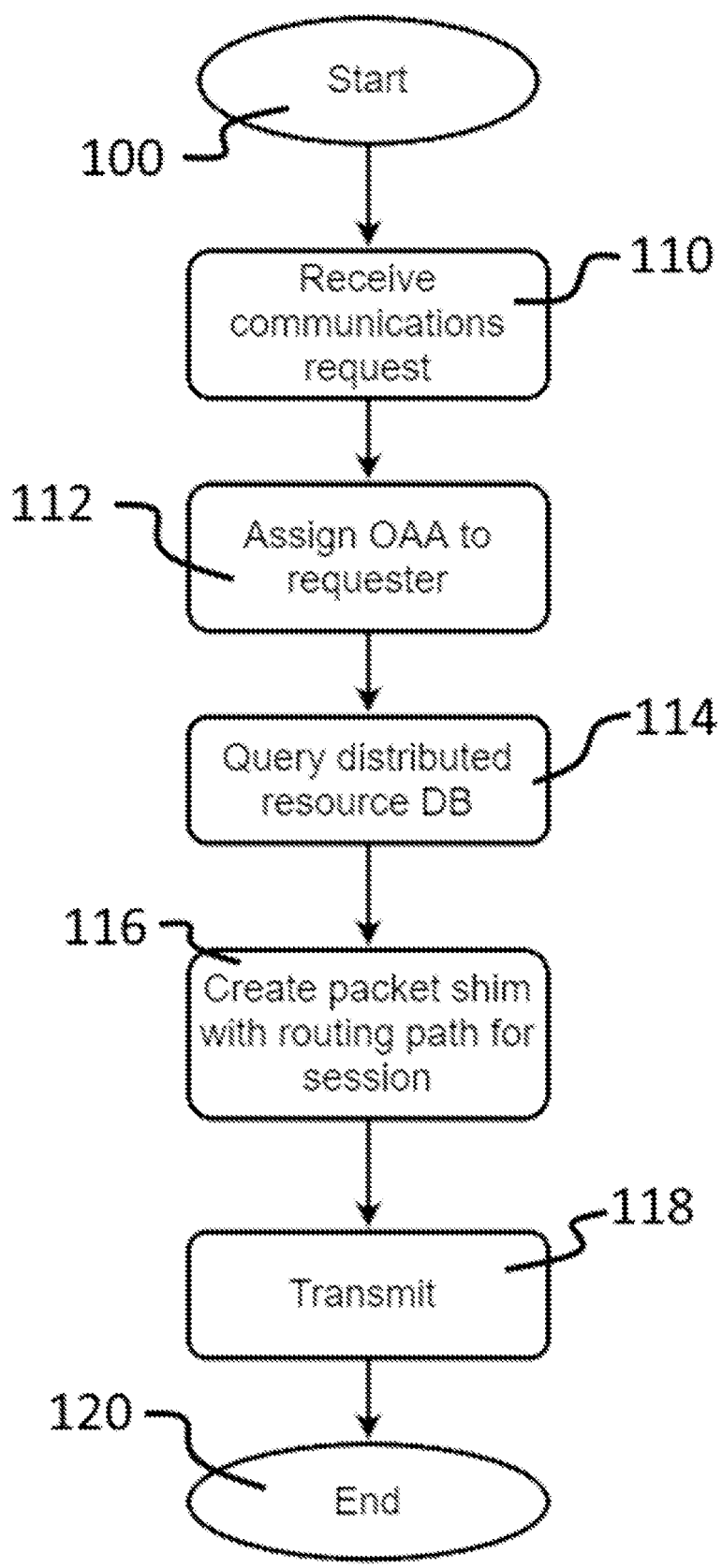
FIG. 1 illustrates a flow chart of steps, some of which, may be employed in certain embodiments.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Read this application with the following terms and phrases in their most general form. The general meaning of each of these terms or phrases is illustrative, not in any way limiting.

Lexicography

The term "client" generally refers to a VPN user who may be trying to access protected content.

The term "connector" generally refers to a service (such as a web service) that exports protected content subject to one or more factors of user authentication.

The term "Static Resource" generally refers to a networked resource provided by a connector.

The term "resource" generally refers to a routing target uniquely namespaced for a particular environment.

The term "dynamic resource" generally refers to a fully-meshed access model, where all clients both export and consume a resource. In this model, each client joins a mesh and can interact with any other client over the mesh.

The term "virtual private network (VPN) generally refers to a network system that enables users to send and receive data across shared or public networks as if their computing devices were directly connected to a private network. VPN may operate by encryption and encapsulation of data packets before transmitting.

DETAILED DESCRIPTION

Disclosed herein are embodiments of a private gateway (PG) model that may include a common virtual private network (VPN) server operable to virtualize a multi-tenant service, thus giving users access to a private virtualized access server with full access to any global infrastructure provided by the cloud-connected VPN service. The access server may be a multi-tenant access server capable of deployment in a software as a service (SaaS) model. In this embodiment, clients and connectors connect via an VPN tunnel to a VPN cloud which then provides an authenticated, secure data path between them. This Open VPN cloud itself may be a scalable cluster of nodes, globally distributed across multiple regions and/or managed by a service provider.

Conventionally in IP-based networks, an IP address or interface is the target of a route. This doesn't perform well with multi-tenant routing, because each tenant has its own global IPv4 and IPv6 address space that might conflict with other tenants. In some embodiments there are producers and consumers of resources. A producer may be a web service while a consumer might be a web browser interacting with the web service over a private network. When a consumer wants to reach a resource, it performs a query to look up all exports of the resource (there may be more than one from multiple producers). When a service exports an endpoint as a resource, it may be essentially registering itself as capable of fielding requests for that service. This may be referred to as a publish/subscribe model, where exporters publish the resource and clients, or connectors subscribe to it. It then chooses an instance of the exported resource which is "close" to the consumer, preferably in the same geographic region. When a consumer queries a resource, it receives a list of producers that export that resource and a routing path to reach each exported resource.

OSI Model

In the well-known OSI reference model, the communications between a computing system are split into seven different abstraction layers: Physical, Data Link, Network, Transport, Session, Presentation, and Application. Most operating systems and routers today have a notion of a Layer 4 session because it is necessary for connection tracking, stateful firewall, and NAT (network address translation). While most IP routing systems handle traffic at OSI layer 3 (network layer), embodiments disclosed herein may control traffic at OSI layer 4, the transport layer.

While OSI layer 3 routing requires a network map to be distributed across the network using a protocol such as BGP or OSPF, PG as described herein may route TCP, UDP, and ICMP sessions (not packets) at layer 4 using an embodiment wherein the first hop PG node fully determines the path to the target host, and intermediate routers don't need any information beyond their local routing map.

Augmented Addressing

Certain embodiments may effectuate PG model by assigning a local 32-bit identifier (ID) to each VPN client or connector connected to a PG node. This identifier may be an OpenVPN Augmented Address (OAA). An OAA uniquely identifies an VPN client connected to a PG node. The OAA may be unique on the PG node itself.

Some embodiments mesh a cluster of PG nodes together using mesh links, wherein each PG node is interconnected with every other PG node with one or more mesh links. The mesh links themselves may be constructed from VPN sessions and each end of a mesh link may also be assigned a locally unique OAA.

When a client requests access to a resource, the request is processed by the PG node that the client is directly connected to. The PG node operates as a facilitator of the request (the first-hop PG node). The PG node then queries a distributed resource database to create a packet shim that may define a sequence of routing hops to reach a designated target resource. The packet shim header may be inserted at the head of the packet.

When the very first packet of a session is constructed by the first-hop PG node, the PG node prepends the routing path shim to the IP packet cleartext (before encryption). Since each client, connector, or mesh link is assigned an OAA, it becomes possible to specify the routing path for a session as a sequence (or stack) of OAAs. Then the routing model operates by each hop popping the next-hop OAA address off the top of the stack and forwarding the remaining session packet to the next hop.

Packet Routing

In operation, labeling the initial packet of a session may establish a route that can persist for the lifetime of a session. This may be effectuated by making a change to the way that the IP protocol stack classifies a layer 4 session. Most IP stacks contain connection tracking logic that tries to identify a layer 4 session and assign it a key, so that future packets on the connection can be properly associated with the session. This key is normally the 5-tuple of (protocol, source IP address, source port, destination IP address, and destination port). In certain embodiments disclosed herein, more members may be added to this tuple: (such as source OAA and destination OAA). By adding these additional members, the OAA part of the session key identifies a unique layer 4 session. By making this change to the existing connection tracking system in the network stack, one may effectuate a multi-tenant address model with complete cross-tenant isolation (because the OAA is different for each tenant), as well as a routing system that routes sessions rather than packets (because the source and destination OAA is part of the connection tracking state).

In some embodiments, connection tracking may work as follows: once a session is keyed by the Layer 4 tuple (with source/destination OAA added), any further packets associated with the session can be identified as being part of the session and be routed. In addition, connection tracking establishes bidirectional tracking, so even return packets may be identified with the session and be appropriately return-routed. With this novel approach, the OAA sequence may only need to be attached to the very first packet to establish a unique connection-tracked chain between each hop of the routing path. In some embodiments, once the chain of connection tracking states is established, it is no longer necessary to label the packet with the OAA because the OAA is now implied by the source or destination VPN link. For example, and without limitation, if an OpenVPN packet is received on a machine, it is always received in the context of an OpenVPN client or connector which has already been assigned a locally unique OAA. The OAA provides advantages over convention routing such as multiprotocol label switching (MPLS). MPLS uses a path-based routing stack, but doesn't include many other aspects as disclosed herein such as augmenting the OSI layer 4 tuple with source and destination OAA, leveraging on connection tracking for route persistence, and the multi-tenant aspects of the model that allow each tenant to control an unfettered IPv4/IPv6 space.

Moreover, as the first packet of a layer 4 session transits from the first-hop PG node to the resource target, on each hop it may trigger the creation of a connection tracking context that encapsulates all of the information necessary to route future packets as well as return packets. These connection-tracking contexts act as a kind of key chain, where the endpoints of each link in the chain are keyed by the original Layer 4 tuple that has been augmented by the source and destination OAAs. Connection tracking may be implemented as a hash table inside the network stack so that when an incoming or outgoing packet is seen, the Layer 4 tuple of the IP header may be used as a key to index into this table to find the session context. With PG as described herein, the OAA is also part of the key.

The embodiments of connection-tracked sessions between source and target resources disclosed herein provide several unbeknownst beforehand benefits:

Once the chain is established, no further OAA modifications may be required because the chain encapsulates all of the information needed to identify packets that belong to the session and route them to the correct local VPN link identified by the OAA. Even the OAA may be implied by the incoming/outgoing VPN link, so subsequent packets (after the first) generally will not require any additional address labeling.

The connection tracking chain is bidirectional meaning that return packet routing occurs without any additional burden on the communications network.

The addition of the source/destination OAA to the connection tracking routing tuple makes the routing system fully multi-tenant because each client or connector may be assigned a unique OAA on its connecting node, and each tenant can choose arbitrary IPv4/IPv6 networks and hosts without the possibility of conflict with other tenants.

Because an OAA is always local to a specific PG node, when routing sessions by OAA, PG nodes do not need access to any global data. Only the originating node needs to look up the OAA path to a resource.

FIG. 1 illustrates a flow chart of steps, some of which may be employed in certain embodiments. Not every step is required in every embodiment and the order of steps may be different in different embodiments. The method starts at a flow label 100.

At a step 110 a server receives a communications request. The server may be connected to a network and include processor instructions operable to function as a private gateway node.

At a step 112 an OpenVPN Augmented address is assigned to the requestor. The OAA may be unique either to a local cluster or globally.

At a step 114 the server queries a distributed resource database to determine the location and/or unique identifier of the target of the communications request.

At a step 116 a packet shim is created with routing path information for the communications and inserted into a packet header.

At a step 118 the communication is transmitted to the first hop in the routing path.

At a flow label 120 the method ends.

The packet shim of step 116 operates to establish a communications session on layer 4 (Transport) between the requestor and the target resource. Once the session is created, two-way communications are effectuated because intermediate steps, such as routers, operate on internal routing maps.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effectuate such feature, structure or characteristic in connection with other embodiments whether or not explicitly described. Parts of the description are presented using terminology commonly employed by those of ordinary skill in the art to convey the substance of their work to others of ordinary skill in the art.

Figure 2:
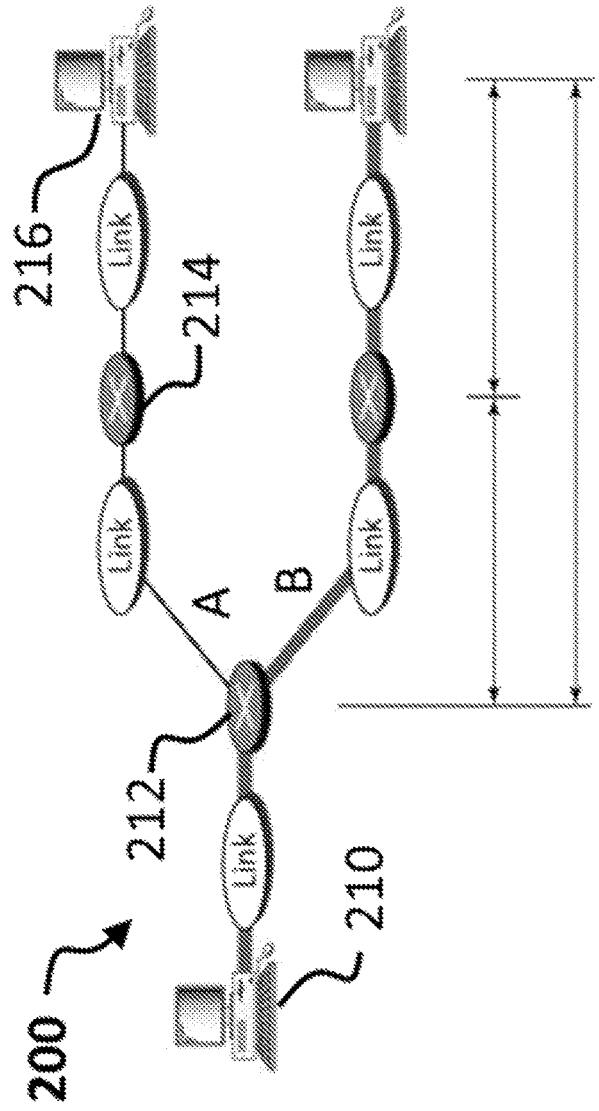
FIG. 2 illustrates a system diagram according to the current disclosure.
Figure 2:
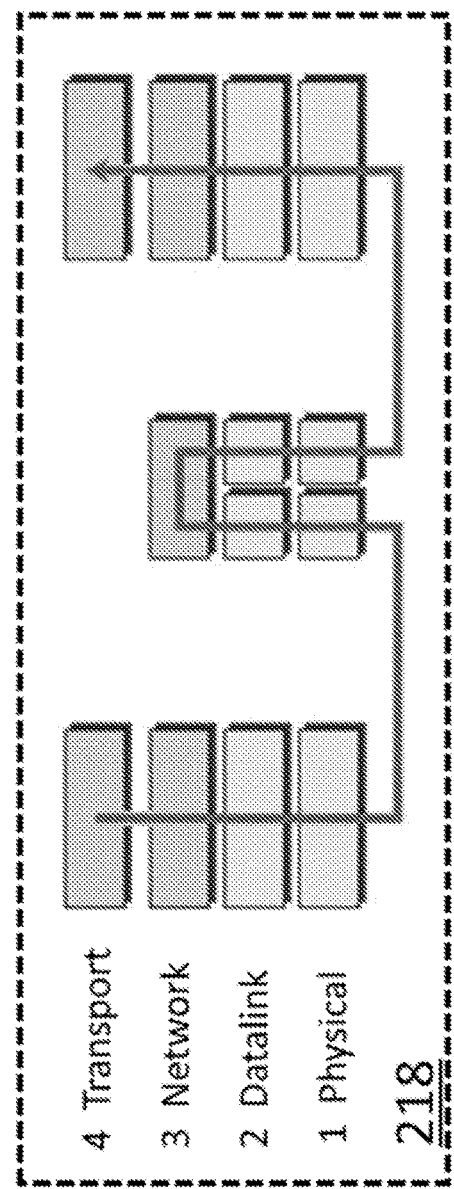

FIG. 2 illustrates a system 200 diagram according to the current disclosure. In FIG. 2 a requesting device 212 such as a personal computer desiring to connect with a web server resource 216 is coupled to a private gateway (PG) 212. The private gateway 212 is coupled to a mesh network (only branch A and B are shown for clarity). The PG 212 includes, or is coupled to, a structured data store that includes addressing information for the resources on the mesh. Examination of the request provides the PG node 212 information to identify a unique ID, such as an OAA, for the devices and prepend the OAA to the data packets before transmission.

The PG 212 may create a packet shim for the Transport layer of the OSI communications model before sending the packet over links to the first "hop" or router for further processing. The shim may include a sequence of routing "hops" required to reach a given resource. At each "hop" along the transmission path it triggers the creation of a connection tracking context that encapsulates all of the information necessary to route future packets for that session. Once a session is established, intermediate devices 214 conventionally do not need any more information than that contained in local routing maps. In multi-hop embodiments, the intermediate devices may pop the next hop OAA off the routing stack and forward the packet to the next device.

The transmission process may be modeled by the layers shown in box 218. At the PG node at least 4 layers of the OSI model are employed. Subsequent hops may only need to work on layers 1-3 to effectuate transmission once the communication link is established. At the target device, higher level stages operate to perform the task intended by the requester.

The above illustration provides many different embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method for improving network communications including:
    creating a unique identifier for a plurality of resources, said plurality of resources coupled to a virtual private network (VPN), said unique identifier locally unique to the VPN;
    querying a unique identifier data store, said data store including the plurality of resources, each of said resources associated with a locally unique identifier for the VPN;
    augmenting a communication packet by adding a packet shim with routing information to a header of the packet, said packet shim including a source unique identifier and a destination unique identifier, wherein the packet shim further includes a sequence of routing hops to reach a designated destination resource,
    transmitting, through a private gateway, the communication packet to a routing device, and
    establishing a communications session on OSI layer 4 between the source and the destination resource.

2. A method for improving a virtual private network (VPN) communications including:
    receiving, at a communication node, an augmented packet, said packet including a session information, a shim including a unique source identifier and a unique destination identifier, and a routing shim with a stack of augmented resource addresses;
    creating a connection tracking context that encapsulates information necessary to route future packets for the session;
    removing an address from the stack of augmented resource addresses, and
    forwarding the augmented packet to the next address of the stack of augmented addresses,
    wherein the future packets are routed at the transport layer.

* * * * *